United States Patent
Lee et al.

(10) Patent No.: US 10,460,672 B2
(45) Date of Patent: Oct. 29, 2019

(54) IMAGE DATA PROCESSING APPARATUS THAT OVERDRIVES PIXELS OF A DISPLAY DEVICE TO INCREASE REACTION SPEED OF THE PIXELS

(71) Applicant: SILICON WORKS CO., LTD., Daejeon (KR)

(72) Inventors: You Shin Lee, Seongnam-si (KR); Young Jun Jun, Suwon-si (KR); Young Sun Na, Yongin-si (KR); Jae Hwan Lim, Seoul (KR); Seong Hyeon Jo, Seongnam-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 15/646,854

(22) Filed: Jul. 11, 2017

(65) Prior Publication Data
US 2018/0018922 A1    Jan. 18, 2018

(30) Foreign Application Priority Data
Jul. 13, 2016    (KR) .................. 10-2016-0088905

(51) Int. Cl.
| | | |
|---|---|---|
| *G09G 3/3291* | (2016.01) | |
| *H04N 19/132* | (2014.01) | |
| *H04N 19/136* | (2014.01) | |
| *H04N 19/196* | (2014.01) | |
| *H04N 19/176* | (2014.01) | |
| *G09G 3/20* | (2006.01) | |
| *G09G 3/36* | (2006.01) | |

(52) U.S. Cl.
CPC ......... *G09G 3/3291* (2013.01); *G09G 3/2007* (2013.01); *G09G 3/3648* (2013.01); *H04N 19/132* (2014.11); *H04N 19/136* (2014.11); *H04N 19/176* (2014.11); *H04N 19/196* (2014.11); *G09G 2310/08* (2013.01); *G09G 2320/0223* (2013.01); *G09G 2320/0242* (2013.01); *G09G 2320/0252* (2013.01); *G09G 2320/0285* (2013.01); *G09G 2340/02* (2013.01); *G09G 2340/16* (2013.01)

(58) Field of Classification Search
CPC .......... G09G 2340/02; G09G 2340/16; G09G 3/3291; G09G 3/3648; G09G 3/3406; G09G 3/3607; G09G 3/2003; G09G 3/609; H04N 19/136
See application file for complete search history.

(56) References Cited

U.S. PATENT DOCUMENTS 9,171,491 B1 * 10/2015 Kwon .................. G09G 3/3648
2007/0159492 A1 * 7/2007 Lo ......................... G09G 5/026
345/589

(Continued)

FOREIGN PATENT DOCUMENTS

KR    10-2011-0063023 A    6/2011

*Primary Examiner* — Jennifer Mehmood
*Assistant Examiner* — James S Nokham
(74) *Attorney, Agent, or Firm* — Fenwick & West LLP

(57) ABSTRACT

The present invention generates overdriving image data by compressing and storing image data and comparing stored previous-period image data and current-period image data. The present invention controls a data voltage upward or downward through overdriving image data, thereby improving the reaction speed of a pixel.

12 Claims, 9 Drawing Sheets

(56) References Cited

U.S. PATENT DOCUMENTS

| | | | |
|---|---|---|---|
| 2012/0249613 A1* | 10/2012 | Takada | G09G 3/3406 345/690 |
| 2013/0010014 A1* | 1/2013 | Hasegawa | G09G 3/3607 345/690 |
| 2013/0120472 A1* | 5/2013 | Byun | G09G 5/02 345/690 |
| 2014/0043357 A1* | 2/2014 | Yamato | G09G 3/3607 345/603 |
| 2016/0132999 A1* | 5/2016 | Kwon | G06T 5/008 345/593 |
| 2017/0263171 A1* | 9/2017 | Li | G09G 3/2003 |

* cited by examiner

IMAGE DATA PROCESSING APPARATUS THAT OVERDRIVES PIXELS OF A DISPLAY DEVICE TO INCREASE REACTION SPEED OF THE PIXELS

CROSS REFERENCE TO RELATED APPLICATION

This application claims priority from Korean Patent Application No. 10-2016-0088905, filed on Jul. 13, 2016, which is hereby incorporated by reference in its entirety.

BACKGROUND OF THE INVENTION

1. Field of the Invention

The present invention relates to image data processing technology, which is used for a display device.

2. Description of the Prior Art

As society develops into an information-based society, display devices for displaying images are being increasingly required in various forms, and in recent years, various display devices such as liquid crystal displays (LCD), plasma display panels (PDP), and organic light-emitting display devices (OLED) have been utilized.

A display device controls the brightness of each pixel according to received image data, thereby displaying an image on a panel. Generally, the brightness of each pixel is determined based on an analog voltage supplied to each pixel, and the display device may control the brightness of each pixel by converting image data to an analog voltage and supply the analog voltage to each pixel.

The display device supplies an analog voltage to each pixel through a data line disposed on a panel. When parasitic capacitance exists in the data line, capacitance exists in each pixel, or a delay characteristic exists in the composition of each pixel, a predetermined delay may occur until an analog voltage is transferred to each pixel and the brightness changes.

For example, in the case of a liquid crystal display device (LCD), the brightness is controlled as the liquid crystal state of each pixel changes based on an analog voltage supplied to each pixel. In this instance, as the brightness changes from a first brightness to a second brightness based on the characteristic of a liquid crystal (a reaction speed), a predetermined delay may occur.

When the state change of each pixel is delayed when compared to the change of image data, a motion-blur phenomenon that blurs an image displayed on a panel may occur. The motion-blur phenomenon may be a factor that decreases the immersion level of a user.

SUMMARY

Against this background, an aspect of the present invention is to provide a technology for improving the reaction speed of each pixel with respect to image data.

In accordance with an aspect of the present invention, there is provided an image data processing apparatus, the apparatus including an RGBX converter (R:Red, G:Green, B:Blue, and X:X is a component of R, G, and B, or a component corresponding to a combination of at least one of R, G, and B), an RGBX encoder, a first RGBX decoder, a second RGBX decoder, and an Overdriving (OD) calculating unit.

In the image data processing apparatus, the RGBX converter converts RGB data to RGBX data. The RGBX encoder generates compressed data of the RGBX data, and periodically stores the compressed data in memory. A first RGBX decoder decompresses the compressed data to generate RGBX"(n) data, and a second RGBX decoder decompresses compressed data of a previous period stored in the memory to generate RGBX"(n−1) data. The OD calculating unit compares the RGBX"(n) data and the RGBX"(n−1) data to generate OD RGBX data of the RGBX data.

In accordance with another aspect of the present invention, there is provided an image data processing method.

The image data processing method may include: converting RGB data to RGBW data; periodically converting the RGBW data to YUVW data and performing Block Truncation Coding (BTC) conversion to generate encoded data; decoding current-period encoded data and previous-period encoded data and comparing current-period encoded data and the previous-period encoded data; and generating OD RGBX data of the RGBW data based on the comparison.

In accordance with another aspect of the present invention, there is provided a display device including a panel, a timing controller, and a source driver.

In the display device, a plurality of pixels and a plurality of data lines, which transfer data voltage to the pixels, are disposed on the panel.

The timing controller converts Red-Green-Blue (RGB) data to RGBX data (X indicates a component of R, G, and B or a component corresponding to a combination of at least one of R, G, and B), periodically stores compressed data of the RGBX data in memory, decompresses current-period compressed data and previous-period compressed data stored in the memory to compare the current-period compressed data with the previous-period compressed data, and generates OD RGBX data of the RGBX data based on the comparison.

The source driver converts the OD RGBX data to the data voltage and outputs the data voltage to the data line.

According to the present invention, the reaction speed of each pixel with respect to image data may be increased, and a motion-blur phenomenon may be alleviated.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
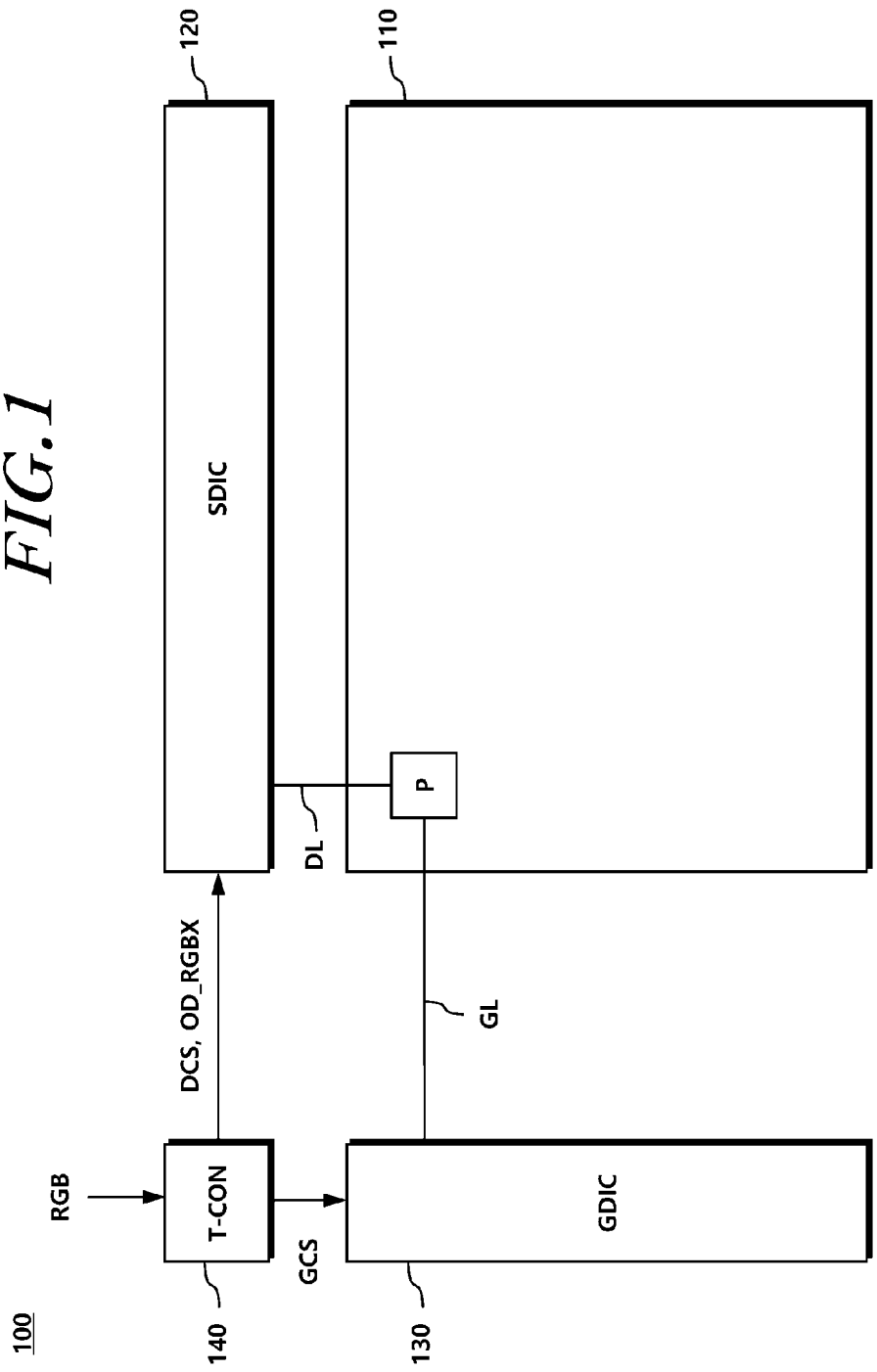
FIG. 1 is a diagram illustrating a display device according to embodiments of the present disclosure.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating a display device according to embodiments of the present invention.

Referring to FIG. 1, a display device 100 may include a panel 110 on which a plurality of pixels (P) is disposed, and an apparatus for processing image data.

The apparatus for processing image data may be divided into a source driver 120, a gate driver 130, a timing controller 140, and the like. The apparatus may be divided based on a function, and two or more apparatuses may be integrated into a single piece of hardware, or may be realized separately from one another. For example, the source driver 120 and the timing controller 140 may be configured as a single piece of hardware or may be configured as different pieces of hardware, and may exchange signals/data through communication. Hereinafter, for each of description, the apparatus for processing image data may be distinguished as the source driver 120, the gate driver 130, the timing controller 140, and the like.

The panel 110 may be embodied as a flat-display-element-based panel, such as a liquid crystal display (LCD), a field emission display (FED), a plasma display panel (PDP), an organic light-emitting display (OLED), an electrophoretic display (EPD), or the like. In an embodiment in which the panel 110 includes liquid crystal display elements, a liquid crystal layer may be formed between two substrates of the panel 110. In the embodiment, a plurality of data lines (DL), a plurality of gate lines (GL) that intersects with the DLs, a plurality of Thin Film Transistors (TFT) formed at intersections at which the data lines (DL) and the gate lines (GL) intersect, a plurality of pixel electrodes for charging liquid crystal cells with a data voltage, a storage capacitor for accessing a pixel electrode and maintaining the voltage of a liquid crystal cell, and the like are included on the lower substrate of the panel 110. In the embodiment, a black matrix, a color filter, and the like are located in the upper substrate of the panel 110.

The source driver 120 may drive a data line (DL). The gate driver 130 supplies a scan signal (also referred to as 'gate signal') to a gate line (GL). The timing controller 140 may supply various control signals to the source driver 120 and the gate driver 130 to control the source driver 120 and the gate driver 130.

The timing controller 140 starts a scan based on a timing implemented by each frame, and outputs image data (OD_RGBX), which is obtained by converting image data (RGB) input from the outside into a form appropriate for the source driver 120. In this instance, the image data (OD_RGBX) may be image data to which overdriving is applied to improve the reaction speed of each pixel.

The timing controller 140 may transmit a control signal to the source driver 120 and the gate driver 130 to control data driving to be performed in time for a scan.

The gate driver 130 may supply a scan signal of a high-level gate voltage or a low-level gate voltage to a gate line (GL) under the control of the timing controller 140.

The gate driver 130 may be located on one side of the display panel 110, as illustrated in FIG. 1, depending on the driving scheme, or may be located on both sides in some cases.

Also, the gate driver 130 may include a plurality of gate driver integrated circuits (GDIC).

Also, the plurality of GDICs may be connected with a bonding pad of the panel 110 based on a tape-automated-bonding (TAB) scheme or a chip-on-glass (COG) scheme, or may be disposed directly on the panel 110 by being embodied as a gate-in-panel (GIP) type. In some cases, the GDICs may be disposed to be integrated on the panel 110. Also, the plurality of GDICs may be embodied based on a chip-on-film (COF) scheme.

Each of the plurality of GDICs included in the gate driver 130 may include a shift register, a level-shifter, and the like.

When a predetermined gate line (GL) is open, the source driver 120 may convert image data received from the timing controller 140 to a data voltage in the form of an analog voltage, and may supply the data voltage to data lines (DL).

The source driver 120 may include one or more source driver integrated circuits (SDIC).

The one or more SDICs included in the source driver 120 may be connected with a bonding pad of the panel 110 based on a tape-automated-bonding (TAB) scheme or a chip-on-glass (COG) scheme, or may be directly disposed on the panel 110. In some cases, the SDICs may be disposed to be integrated on the panel 110. Also, the one or more SDICs may be embodied based on a chip on film (COF) scheme. According to the COF scheme, in each of the one or more SDICs, one end may be bonded to at least one source printed circuit board and the other end may be bonded to the display panel 110.

Each of the one or more SDICs included in the source driver 120 may include a shift register, a latch circuit, a digital-to-analog converter (DAC), an output buffer, and the like. In some cases, each SDIC may further include an analog-to-digital converter (ADC) that senses an analog voltage value for pixel compensation, converts the sensed value to a digital value, generates sensing data, and outputs the generated sensing data.

The timing controller 140 may receive various timing signals including a vertical synchronization signal, a horizontal synchronization signal, an input data enable (DE) signal, a clock signal, and the like, together with image data (RGB) from the outside.

The timing controller 140 may receive a timing signal, such as a vertical synchronization signal (Vsync), a horizontal synchronization signal (Hsync), an input data enable signal, a clock signal, and the like, generate various control signals, and output the various control signals to the source driver 120 and the gate driver 130 to control the source driver 120 and the gate driver 130, in addition to outputting image data (OD_RGBX) which is obtained by converting image data (RGB) input from the outside into a form that is appropriate for the source driver 120.

For example, in order to control the gate driver 130, the timing controller 140 outputs various gate control signals (GCSs) including a gate start pulse (GSP), a gate shift clock (GSC), a gate output enable (GOE) signal, and the like. Here, the GSP controls the operation start timing of one or more GDICs included in the gate driver 130. The GSC is a clock signal that is commonly input to one or more GDICs, and controls a shift timing of a scan signal. The GOE signal designates timing information of one or more GDICs.

To control the source driver 120, the timing controller 140 may output various data control signals (DCS) including a source start pulse (SSP), a source sampling clock (SSC), a source output enable (SOE) signal, and the like. Here, the SSP controls a data sampling start timing of one or more SDICs included in the source driver 120. The SSC is a clock signal that controls a sampling timing of data in each SDIC. The SOE signal controls the output timing of the source driver 120.

The timing controller 140 may be disposed on a source printed circuit board to which an SDIC is bonded, or may be disposed on a control printed circuit board that is connected to the source printed circuit board to which an SDIC is bonded, through a connection medium such as a flexible flat cable (FFC), a flexible printed circuit (FPC), or the like.

On the source printed circuit board or the control printed circuit board, a power controller (not illustrated) may be further disposed, that supplies various voltages or currents to the panel 110, the source driver 120, the gate driver 130, and the like, or controls various voltages or currents to be supplied. The power controller (not illustrated) is referred to as a Power management IC (PMIC).

Image data (OD_RGBX) that the timing controller 140 transmits to the source driver 120 is image data to which overdriving is applied so as to increase the reaction speed of each pixel. Overdriving is a process of driving a pixel (P) at a data voltage indicating a brightness higher or lower than a desired brightness to be displayed in the panel 110.

Figure 2:
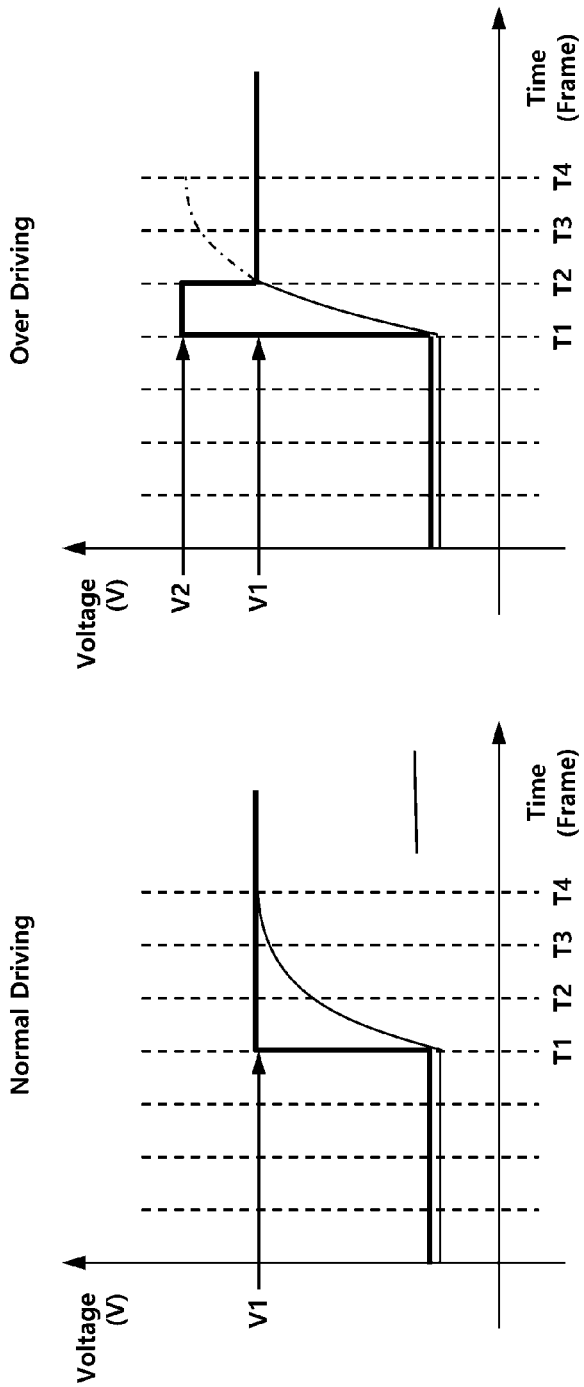
FIG. 2 is a diagram illustrating a comparison between normal driving and overdriving.

FIG. 2 is a diagram illustrating the comparison between normal driving and overdriving.

Referring to FIG. 2, a display device may provide a first voltage (V1) in normal driving to display a first brightness in a pixel at a first point in time (T1). However, due to the reaction speed of the pixel or the parasitic capacitance of a data line connected to the pixel, the provided first voltage (V1) may be reflected in the pixel with a delay. For example, as shown in FIG. 2, with a delay of 3 frames, the first voltage (V1) may be formed in the pixel at a fourth point in time (T4). Alternatively, the brightness of the pixel is changed to a first brightness at the fourth point in time (T4).

To improve the delay, the display device may provide the pixel with a second voltage (V2), which is higher than the first voltage (V1) for the first brightness, in overdriving at the first point in time (T1). Through the overdriving, the first voltage (V1) may be formed in the pixel at the second point in time (T2), which is sooner than the fourth point in time (T4).

The display device according to an embodiment may improve the reaction speed of each pixel through the overdriving.

The overdriving may be mainly implemented by a source driver that outputs a data voltage, or may be mainly implemented by a timing controller that processes image data.

For example, the source driver may implement the overdriving in a manner of receiving image data and controlling a data voltage upward or downward.

As another example, the timing controller may control the data value (e.g., a grayscale value) of image data upward or downward to generate overdriving image data, and may transmit the same to the source driver. The source driver converts the overdriving image data to a data voltage, and outputs the data voltage to a data line.

Hereinafter, an example of implementing overdriving in a manner in which the timing controller processes image data will be described.

Figure 3:
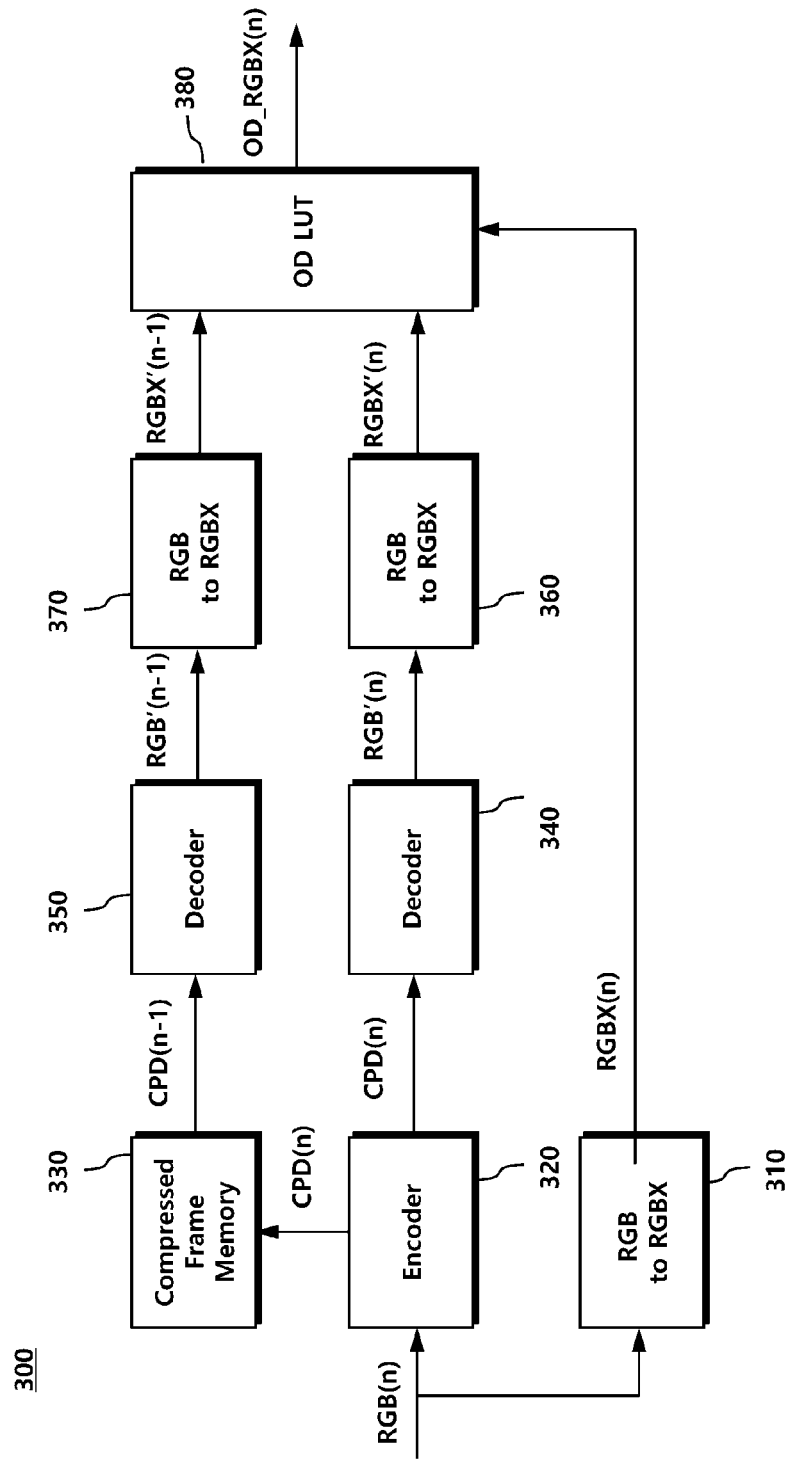
FIG. 3 is a diagram illustrating a timing controller according to a first embodiment.

FIG. 3 is a diagram illustrating a timing controller according to a first embodiment.

Referring to FIG. 3, a timing controller 300 may include a first RGBX converter 310 that converts Red-Green-Blue (RGB) data to RGBX data (where X is a component of R, G, and B, or a component corresponding to a combination of at least one of R, G, and B).

RGB data transferred from the outside is data representing the color of a pixel using a RGB color space. The RGB data may include R component data, G component data, and B component data in an RGB color space.

The RGBX data is data that further includes a component of R, G, and B, or a component corresponding to a combination of at least one of R, G, and B, in addition to the R component, the G component, and the B component. For example, the RGBX data may be RGBW data. In this instance, the RGBW data may further include W (W: White) component data in addition to the R component, the G component, and the B component.

On a panel, pixels corresponding to the RGBX data may be disposed. For example, an R pixel, a G pixel, a B pixel, and an X pixel may be disposed on the panel. When the RGBX data is RGBG data, a G pixel may be further added and disposed on the panel, in addition to the R pixel, the G pixel, and the B pixel.

Image data transferred from the outside may be RGB data expressed in an RGB color space. The first RGBX converter 310 may convert the RGB data to RGBX data according to a pixel disposed on the panel.

The timing controller 300 may include an RGB encoder 320.

The RGB encoder 320 may compress RGB data, and may store the same in the memory 330. The timing controller 300 compares current period (current frame) image data and previous period (previous frame) image data to control overdriving. In this instance, the RGB encoder 320 may compress RGB data and store the same in the memory 330 in order to use the previous period image data. Here, the RGB encoder 320 may compress the RGB data and store the same in order to reduce the usage of the memory 330.

The RGB encoder 320 may generate compressed data (CPD) by applying a predetermined compression algorithm to RGB data, and may store the generated CPD in the memory 330.

The RGB encoder 320 compresses RGB data for each period (e.g., for each frame). In this instance, compressed data (CPD(n)) of current-period RGB data may be decompressed by a first RGB decoder 340. Compressed data (CPD(n−1)) of previous-period RGB data may be decompressed by a second RGB decoder 350.

To reduce the amount of calculations and the amount of usage of the memory 330, an algorithm (e.g., a blocktruncation-coding (BTC) algorithm) that generates a predetermined loss may be applied as both a compression algorithm and a decompression algorithm.

Through a loss-generate algorithm, the first RGB decoder 340 may generate RGB'(n) data, corresponding to current-period RGB data, and the second RGB decoder 350 may generate RGB'(n−1) data, corresponding to previous-period RGB data. The data values of the RGB data and the RGB' data are somewhat different from each other. However, the RGB' data is used only for controlling overdriving, and thus may not affect image quality.

The timing controller 300 may include a second RGBX converter 360 and a third RGBX converter 370. The second RGBX converter 360 converts RGB'(n) data generated by the first RGB decoder 340 to RGBX'(n) data, and the third RGBX converter 370 converts RGB'(n−1) data generated by the second RGB decoder 350 to RGBX'(n−1) data. Here, the RGBX'(n) data is image data that is formed of RGBX components and corresponds to current-period RGB data. The RGBX'(n−1) data is image data that is formed of RGBX components and corresponds to previous-period RGB data.

The timing controller 300 includes an overdriving (OD) calculating unit 380, and the OD calculating unit 380 may compare the RGBX'(n) data and the RGBX'(n−1) data to generate OD RGBX data (OD_RGBX) of RGBX data.

Particularly, the OD calculating unit 380 may compare the RGBX'(n) data and the RGBX'(n−1) data to determine pixels to which overdriving is to be applied. Overdriving may not be applied to pixels that do not have a difference in data values between the current period and the previous period. In this instance, the OD calculating unit 380 may insert the data value of the corresponding pixel of the RGBX data generated by the first RGBX converter 310 as is to OD RGBX data (OD_RGBX). Conversely, overdriving may be applied to pixels of which data values in the current period and the previous period are greater than or equal to a predetermined value. In this instance, the OD calculating unit 380 may calculate a data value to which overdriving is applied by substituting the RGBX data generated by the first RGBX converter 310 and the RGBX'(n−1) data into a lookup table stored in advance, and may insert the data value to the OD RGBX data (OD_RGBX).

The OD calculating unit 380 may generate an OD RGBX data (OD_RGBX), may transmit the same to the source driver, and may enable the source driver to output an overdriving-applied data voltage.

Figure 4:
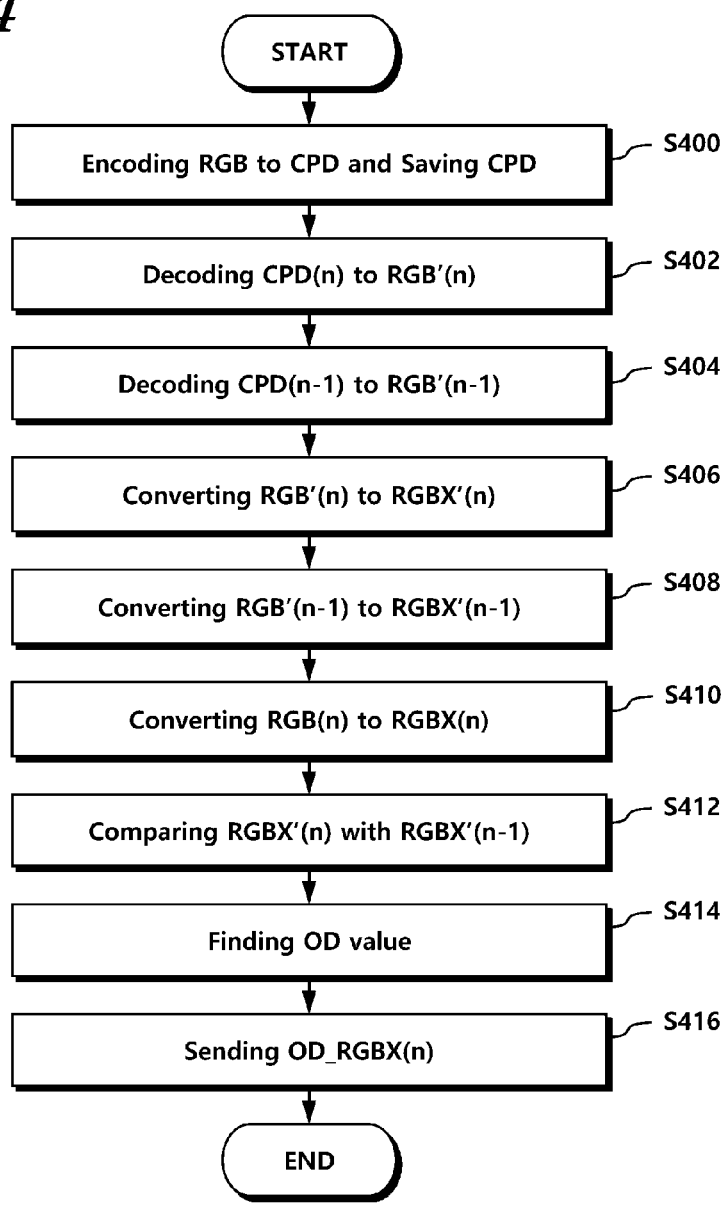
FIG. 4 is a flowchart illustrating an image data processing method according to the first embodiment.

FIG. 4 is a flowchart illustrating an image data processing method according to the first embodiment.

Referring to FIG. 4, an image data processing apparatus (e.g., a timing controller) receives RGB data from the outside, encodes the RGB data to compressed data (CPD), and stores the same in operation S400.

The image data processing apparatus decodes current-period compressed data (CPD(n)) of RGB data to generate RGB'(n) data in operation S402, and decodes stored previous-period compressed data (CPD(n−1)) to generate RGB'(n−1) data in operation S404.

The image data processing apparatus converts RGB'(n) data to generate RGBX'(n) data in operation S406, and converts RGB'(n−1) data to generate RGBX(n−1) data in operation S408.

The image data processing apparatus converts RGB data received from the outside to current-period RGBX(n) data in operation S410.

In a method according to the first embodiment, the image data processing apparatus performs conversion of RGB data to RGBX data three times through operations S406, S408, and S410.

The image data processing apparatus determines pixels to which overdriving is to be applied by comparing RGBX'(n) data corresponding to the current-period RGB data and RGBX'(n−1) data in operation S412, and finds (e.g., calculates) an overdriving data value by applying a lookup table with respect to the corresponding pixel in operation S414.

The image data processing apparatus sends OD RGBX data (OD_RGBX) to which an overdriving data value is applied in operation S416.

Figure 5:
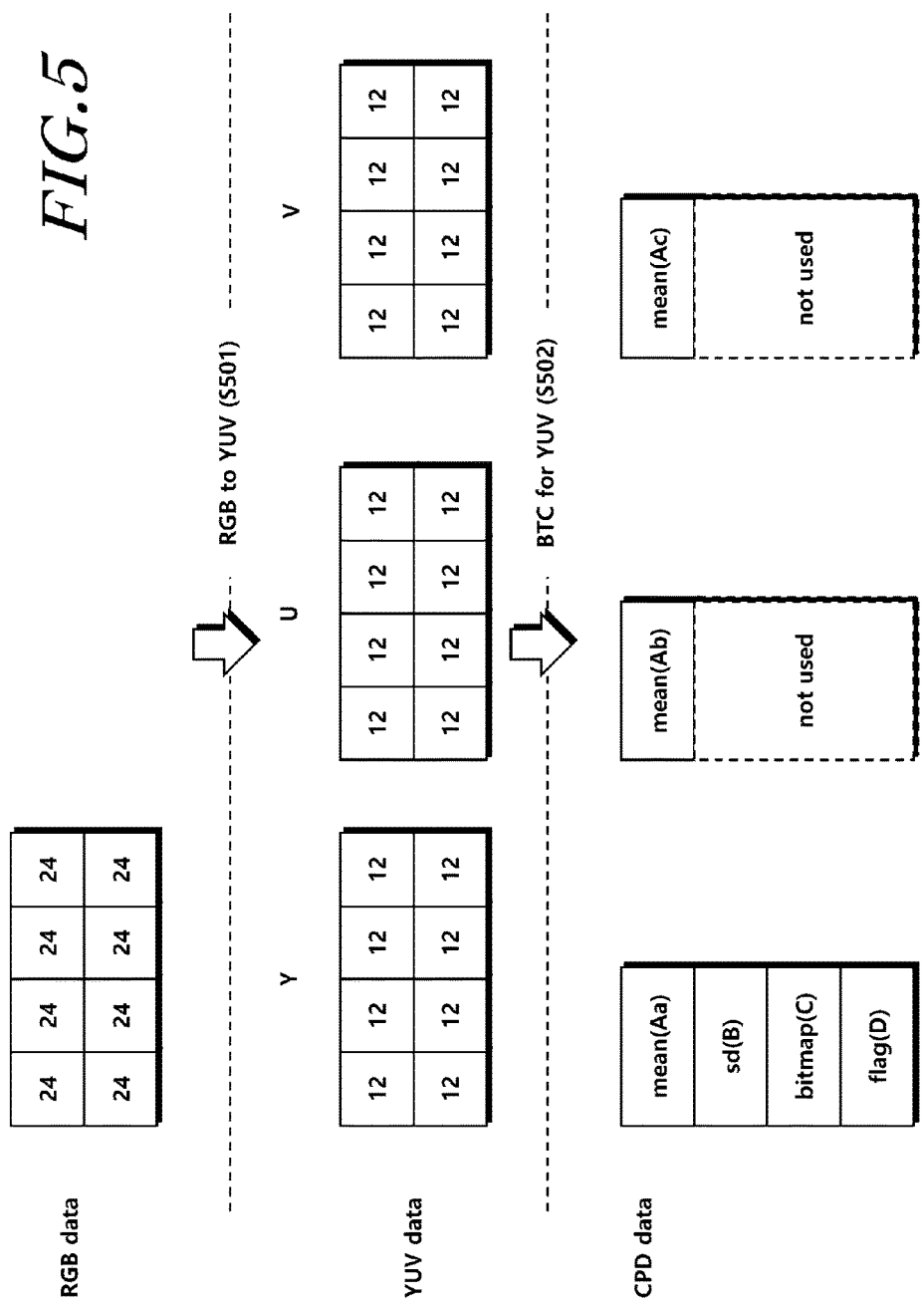
FIG. 5 is a diagram illustrating a process of compressing RGB data according to the first embodiment.

FIG. 5 is a diagram illustrating a process of compressing RGB data according to the first embodiment.

Referring to FIG. 5, in operation S501, an image data processing apparatus (e.g., a timing controller, particularly, an RGB encoder) converts RGB data to YUV data in a process of compressing the RGB data.

Subsequently, the image data processing apparatus performs block truncation coding (BTC) conversion of YUV data in units of blocks set in advance (e.g., 8×2 blocks), to generate compressed data (CPD data) in operation S502.

The BTC conversion is performed for each component of the YUV data. As a result of the BTC conversion, an average, a standard deviation, a bitmap, and a flag with respect to each component may be calculated in units of blocks. The image data processing apparatus calculates and uses only an average with respect to a U component and a V component, and may not calculate a standard deviation, a bitmap, and a flag thereof. Generally, the brightness value of RGB data is strongly reflected to the Y component of YUV data and the brightness value is relatively less reflected to the U component and the V component. Overdriving is highly related to a change in the brightness of a pixel, and thus, the image data processing apparatus may calculate an average, a standard deviation, a bitmap, and a flag with respect to the Y component, and may calculate only an average with respect to the U component and the V component. When some of the above are not used, as described above, the amount of memory occupied by the compressed data may be further decreased.

Through the process, RGB data of a total of 192 bits (24×8=192 bits) may be compressed to 32-bit compressed data (CPD data) (Aa+Ab+Ac+B+C+D=32 bits).

The first embodiment has been described with reference to FIGS. 3 to 5. According to the first embodiment, the reaction speed of each pixel with respect to image data may be increased. Also, the amount of memory usage may be minimized through BTC conversion.

In the first embodiment, a process of converting RGB data to RGBX data is performed three times, which has been described with reference to FIGS. 3 and 4. In this instance, the amount of power consumed in the conversion process increases, and the size of a chip may increase since the number of components increases, which is a drawback.

Hereinafter, a second embodiment will be described with reference to FIGS. 6 to 9. The second embodiment is simplified when compared to the first embodiment by changing data, which is to be compressed, to RGBX data.

Figure 6:
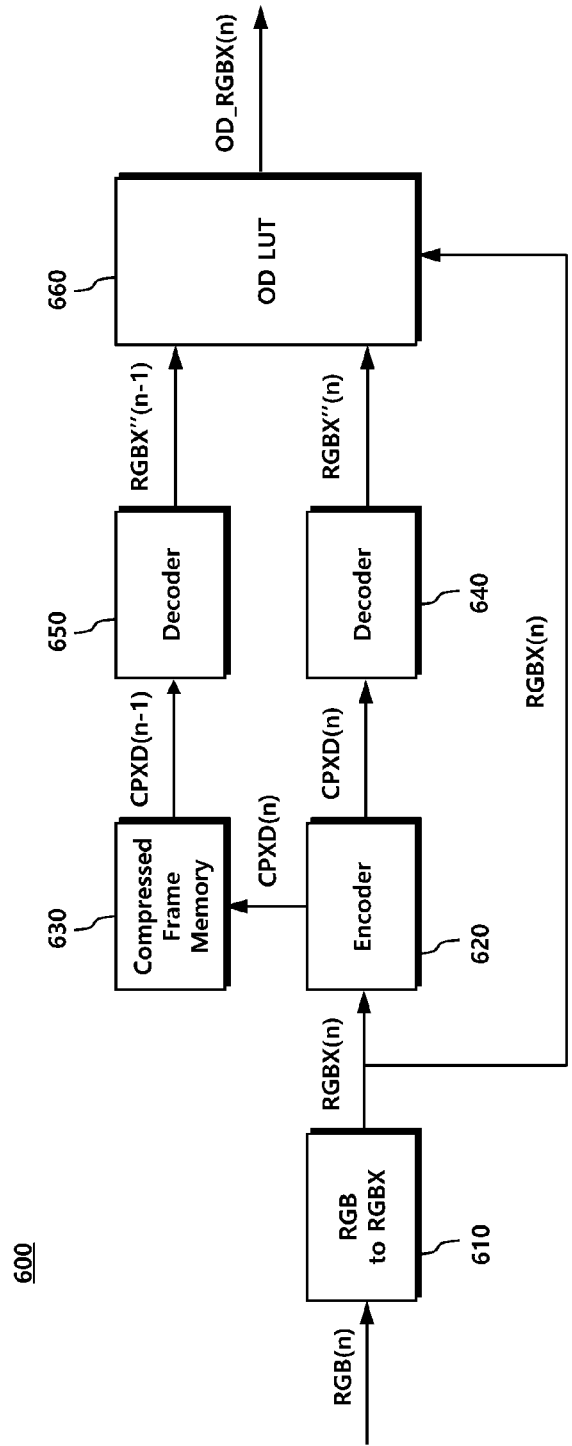
FIG. 6 is a diagram illustrating a timing controller according to a second embodiment.

FIG. 6 is a diagram illustrating a timing controller according to the second embodiment.

Referring to FIG. 6, the timing controller 600 may include an RGBX converter 610, an RGBX encoder 620, a memory 630, a first RGBX decoder 640, a second RGBX decoder 650, and an OD calculating unit 660.

In the timing controller 600 according to the second embodiment, the RGBX converter 610 converts RGB data received from the outside to RGBX data.

The RGBX data may be RGBW data or RGBG data. The form of the RGBX data may be determined based on the form of a pixel disposed on the panel.

Other elements 620, 630, 640, 650, and 660 included in the timing controller 600 may generate other data according to RGBX data generated by the RGBX converter 610.

The RGBX encoder 620 generates compressed data of the RGBX data generated by the RGBX converter 610 (compressed RGBX data (CPXD)), and periodically stores the compressed data (CPXD) in the memory 630 (e.g., each frame).

The first RGBX decoder 640 decompresses current-period compressed data (CPXD(n)) to generate RGBX"(n) data, and the second RGBX decoder 650 decompresses previous-period compressed data (CPXD(n−1)) stored in the memory 630 to generate RGBX"(n−1) data.

To reduce the amount of calculations and the amount of usage of the memory 630, an algorithm (e.g., a block truncation coding (BTC) algorithm) that generates a predetermined loss may be applied as a compression algorithm and a decompression algorithm. During the compression and decompression processes, data loss may occur, and thus there may be a slight difference between RGBX data and RGBX" data.

The OD calculating unit 660 may compare RGBX"(n) data corresponding to current-period RGBX data (n) and RGBX"(n−1) data corresponding to previous-period RGBX data (n−1), to generate OD RGBX data (OD_RGBX) with respect to RGBX data.

Particularly, the OD calculating unit 660 may compare the RGBX"(n) data and the RGBX"(n−1) data to determine the pixels to which overdriving is to be applied. Overdriving may not be applied to pixels that do not have a difference in data values between the current period and the previous period. In this instance, the OD calculating unit 660 may insert the data value of the corresponding pixel of the RGBX data generated by the RGBX converter 610 as is to OD RGBX data (OD_RGBX). Conversely, overdriving may be applied to pixels of which data values in the current period and the previous period are greater than or equal to a predetermined value. In this instance, the OD calculating unit 660 may calculate a data value to which overdriving is applied by substituting the RGBX data generated by the RGBX converter 610 and the RGBX"(n−1) data into a lookup table stored in advance, and may insert the data value into the OD RGBX data (OD_RGBX).

The OD calculating unit 660 may generate an OD RGBX data (OD_RGBX), may transmit the same to the source driver, and may enable the source driver to output an OD data voltage.

Figure 7:
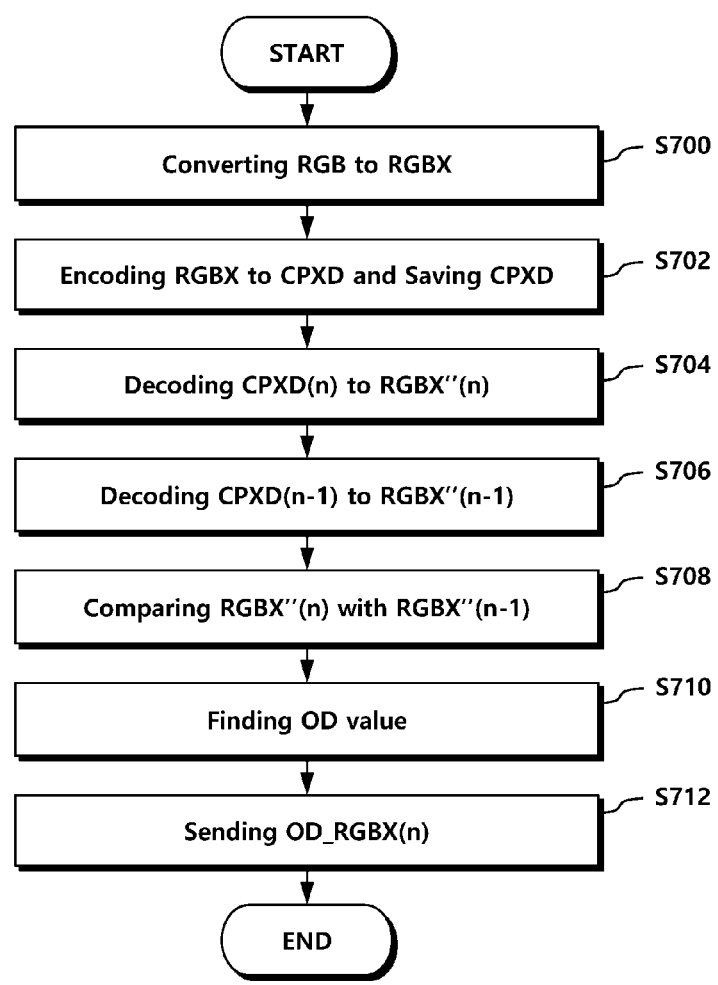
FIG. 7 is a flowchart illustrating an image data processing method according to the second embodiment.

FIG. 7 is a flowchart illustrating an image data processing method according to the second embodiment.

Referring to FIG. 7, an image data processing apparatus (e.g., a timing controller) receives RGB data from the outside, and converts the RGB data to RGBX data (e.g., RGBW data) in operation S700.

The image data processing apparatus generates encoded data by encoding RGBX data for each period, and stores the same in operation S702. For example, the image data processing apparatus compresses RGBX data to generate compressed data (CPXD) for each period and stores the same. In this instance, when the RGBX data is RGBW data, the image data processing apparatus may convert the RGBW data to YUVW data for each period, and may perform BTC conversion to generate encoded data (e.g., compressed data (CPXD)).

The image data processing apparatus decodes the current-period encoded data (e.g., CPXD(n)) to generate RGBX"(n) data in operation S704, and decodes the previous-period encoded data (e.g., CPXD(n−1)) to generate RGBX"(n−1) data in operation S706.

The image data processing apparatus may compare the decoded RGBX"(n) data and RGBX"(n−1) data in operation S708, and may generate OD RGBX data with respect to RGBX data based on the comparison in operations S710 and S712. Particularly, in operations S710 and S712, the image data processing apparatus determines whether to perform overdriving to each pixel based on the comparison in operation S710, and generates OD RGBX data (OD_RGBX) by inputting data obtained by decoding the previous-period encoded data (e.g., CPXD(n−1)) and RGBX data to a lookup table, which takes previous period RGBX data and current period RGBX data as inputs, in operation S712.

Figure 8:
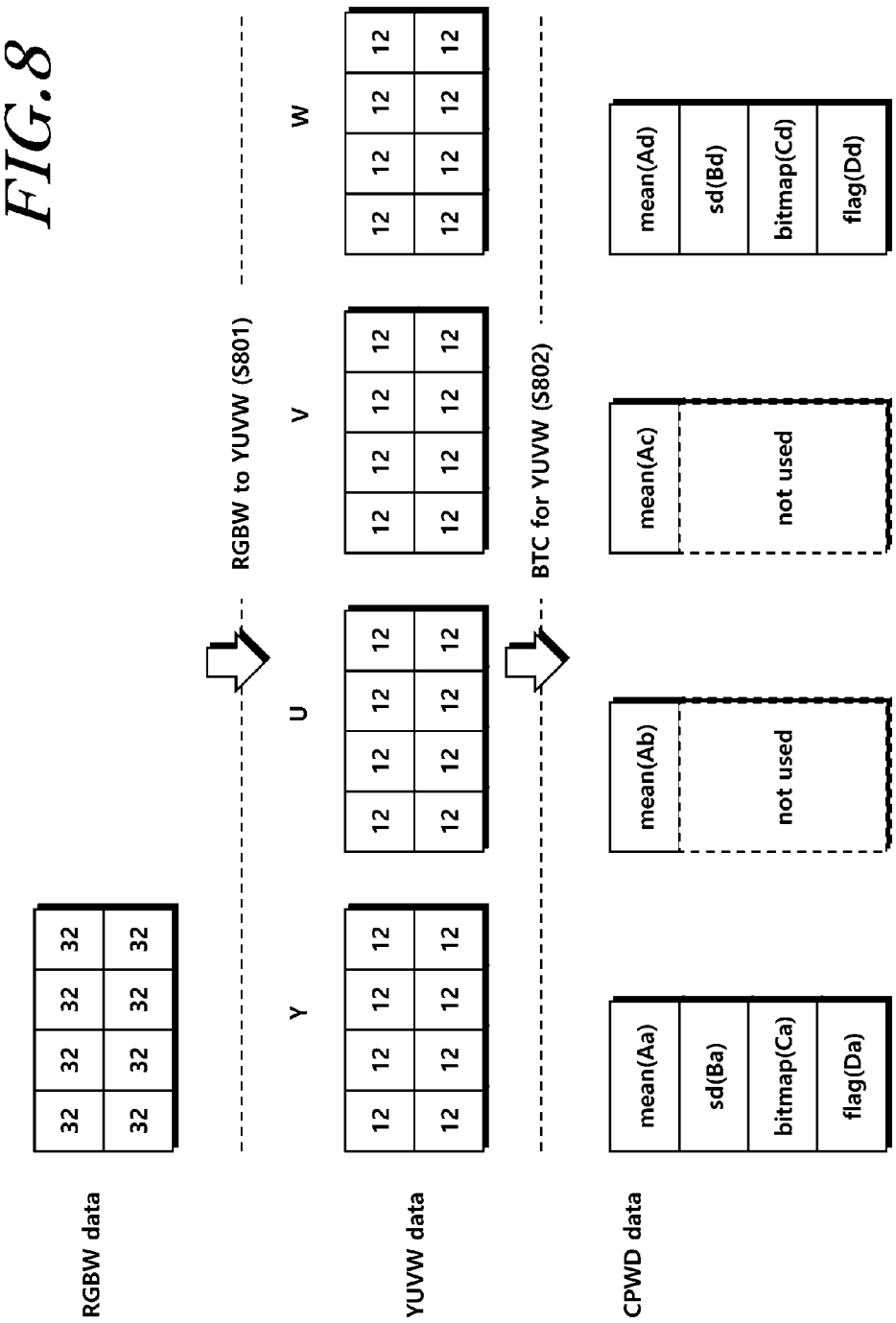
FIG. 8 is a diagram illustrating a first example of a process of compressing RGBW data according to the second embodiment.

FIG. 8 is a diagram illustrating a first example of the process of compressing RGBW data according to the second embodiment.

FIG. 8 illustrates an example in which RGBX is RGBW.

Referring to FIG. 8, in operation S801, an image data processing apparatus (e.g., a timing controller, particularly an RGBX encoder) converts RGBW data to YUVW data.

In this instance, an RGB component of the RGBW data is converted to a YUV component, and a W component may be maintained as is.

The image data processing apparatus performs BTC conversion of the YUVW data in units of predetermined blocks, and generates compressed data (CPWD data) in operation S802.

The BTC conversion may be performed for each component of the YUVW data. As a result of the BTC conversion, an average, a standard deviation, a bitmap, and a flag with respect to each component may be calculated in units of blocks. The image data processing apparatus calculates and uses only an average with respect to a U component and a V component, and may not calculate a standard deviation, a bitmap, and a flag thereof. Generally, the brightness value of RGB data is strongly reflected to the Y component and the brightness value is relatively less reflected to the U component and the V component. Overdriving is highly related to a change in the brightness of a pixel, and thus, the image data processing apparatus may calculate an average, a standard deviation, a bitmap, and a flag with respect to the Y component and the W component, and may calculate only an average with respect to the U component and the V component.

Particularly, the image data processing apparatus (e.g., a timing controller, particularly an RGBX encoder) calculates an average, a standard deviation, a bitmap, and a flag with respect to the Y component and the W component of the YUVW data, and may calculate only an average with respect to the U component and the V component, and includes the average in compressed data (CPWD data).

When some of the above are not used, as described above, the amount of memory occupied by the compressed data may be further decreased. Through the process, RGB data of a total of 256 bits (32×8=256 bits) may be compressed to 47-bit compressed data (CPD data) (Aa+Ab+Ac+Ad+Ba+Bd+Ca+Cd+Da+Dd=47 bits).

Figure 9:
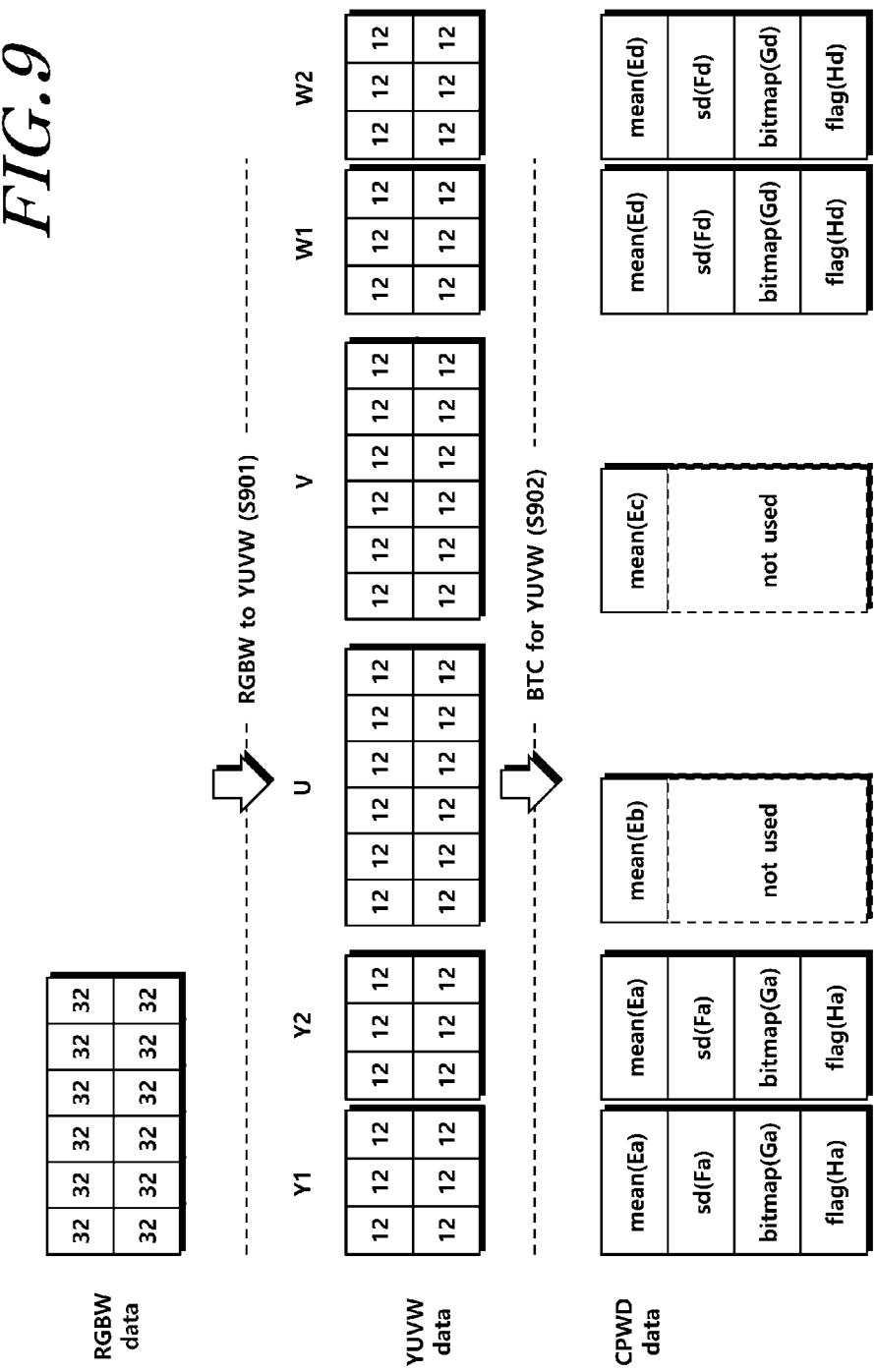
FIG. 9 is a diagram illustrating a second example of a process of compressing RGBW data according to the second embodiment.

FIG. 9 is a diagram illustrating a second example of the process of compressing RGBW data according to the second embodiment.

FIG. 9 illustrates an example in which RGBX is RGBW.

Referring to FIG. 9, in operation S901, an image data processing apparatus (e.g., a timing controller, particularly an RGBX encoder) converts RGBW data to YUVW data.

In this instance, an RGB component of the RGBW data is converted to a YUV component, and a W component may be maintained as is.

The image data processing apparatus performs BTC conversion of the YUVW data in units of predetermined blocks, and generates compressed data (CPWD data) in operation S902.

A block unit for the BTC conversion includes two or more sub-block units.

For example, a block unit formed of 6×2 blocks may be divided into two sub-block units formed of 3×2 blocks.

In this instance, the image data processing apparatus (e.g., a timing controller, particularly, an RGBX encoder) performs BTC conversion with respect to the Y component and the W component of the YUVW based on the sub-block unit, and may perform BTC conversion with respect to the U component and the V component based on the block unit. The image data processing apparatus may calculate an average, a standard deviation, a bitmap, and a flag with respect only to the Y component and the W component, and may calculate only an average with respect to the U component and the V component.

As described above, the image data processing apparatus proceeds with detailed compression/decompression with respect to the Y component and the W component, and proceeds with concise compression/decompression with respect to the U component and the V component, thereby reducing the amount of calculation and the usage of memory, and increasing the accuracy in control.

According to the embodiments of the present invention, which have been described above, the reaction speed of each pixel for image data is increased, and thus a drawback, such as motion blur or the like, may be alleviated. Also, according to the embodiments, the amount of calculation and the usage of memory may be reduced and the accuracy of control may be increased in the process of processing image data.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for processing image data, the apparatus comprising:
   a RGBX converter configured to convert red-green-blue (RGB) data of an image frame to RGBX data wherein X indicates a component of R, G, and B, or a component corresponding to a combination of at least one of R, G, and B;
   a RGBX encoder configured to generate compressed data of the RGBX data converted by the RGBX converter, and to periodically store the compressed data in a memory;
   a first RGBX decoder configured to decompress the compressed data to generate RGBX"(n) data;
   a second RGBX decoder configured to decompress the compressed data of a previous period stored in the memory, to generate RGBX"(n−1) data; and
   an overdriving (OD) calculating unit configured to compare the RGBX"(n) data and the RGBX"(n−1) data to generate OD RGB X data of the RGBX data converted by the RGBX converter;
   wherein the RGB data of the image frame is converted to RGBX data only a single time within the apparatus.

2. The apparatus of claim 1, wherein the RGBX data is RGBW (W:White) data or RGBG data.

3. The apparatus of claim 1, wherein the RGBX encoder converts the RGBX data to YUVX data, and performs block truncation coding (BTC) conversion with respect to the YUVX data to generate the compressed data, wherein YUVX data is data formed of a YUV component and a X component.

4. The apparatus of claim 3, wherein the RGBX encoder generates the YUVX data by converting an RGB component of the RGBX data to the YUV component and maintaining the X component.

5. The apparatus of claim 3, wherein the RGBX encoder calculates an average, a standard deviation, a bitmap, and a flag with respect to each of a Y component and the X component of the YUVX data to include the calculated values in the compressed data, and calculates only an average with respect to each of a U component and a V component to include the calculated value in the compressed data.

6. The apparatus of claim 5, wherein a block unit for a BTC conversion is formed of two or more sub-block units, and
   the RGBX encoder performs BTC conversion with respect to the Y component and the X component of the YUVX data based on the sub-block unit, and performs BTC conversion with respect to the U component and the V component based on the block unit.

7. The apparatus of claim 1, wherein the OD calculating unit compares the RGBX" (n) data and the RGBX" (n−1) data to determine whether to perform overdriving with respect to each pixel, and generates the OD RGBX data with respect to a pixel to which overdriving is to be performed, using a lookup table.

8. A method of processing image data, the method comprising:
   converting red-green-blue (RGB) data of an image frame into RGBW data (W:White);
   periodically converting the RGBW data to YUVW data and performing block truncation coding (BTC) conversion to generate encoded data;

decoding current-period encoded data and previous-period encoded data and comparing the current-period encoded data with the previous-period encoded data; and generating overdriving (OD) RGBX data of the RGBW data based on the comparison;

wherein the RGB data of the image frame is converted to RGBW data only a single time.

9. The method of claim 8, wherein the generating the OD RGBX data comprises:

determining whether to perform overdriving for each pixel based on the comparison, inputting decoded data of the previous-period encoded data and the RGBW data to a lookup table, which takes previous-period RGBW data and current-period RGBW data as inputs, and generating the OD RGBX data.

10. The method of claim 8, wherein the generating the encoded data comprises:

calculating an average, a standard deviation, a bitmap, and a flag with respect to each of a Y component and a W component, and calculating only an average with respect to each of a U component and a V component when performing BTC conversion of the YUVW data.

11. The display device of claim 8, wherein the panel is an organic light-emitting display (OLED) panel, and the RGBX data is RGBW data or RGBG data.

12. A display device, comprising:

a panel on which a plurality of pixels and a plurality of data lines, which transfer a data voltage to the pixels, are disposed;

a timing controller configured to convert red-green-blue (RGB) data of an image frame to RGBX data wherein X indicates a component of R, G, and B or a component corresponding to a combination of at least one R, G, and B, to periodically store compressed data of the RGBX data in a memory, to decompress current-period compressed data and previous-period compressed data stored in the memory to compare the current-period compressed data with the previous-period compressed data, and to generate overdriving (OD) RGBX data of the RGBX data based on the comparison, wherein the RGB data of the image frame is converted to RGBX data only a single time by the timing controller; and a source driver configured to convert the OD RGBX data to the data voltage and to output the data voltage to the data line.

* * * * *